United States Patent
Bender

(10) Patent No.: US 8,974,160 B2
(45) Date of Patent: Mar. 10, 2015

(54) RAIL MOUNTING SYSTEM

(71) Applicant: Adrian Steel Company, Adrian, MI (US)

(72) Inventor: Trevor Bender, Adrian, MI (US)

(73) Assignee: Adrian Steel Company, Adrian, MI (US)

(*) Notice: Subject to any disclaimer, the term of this patent is extended or adjusted under 35 U.S.C. 154(b) by 0 days.

(21) Appl. No.: 13/898,596

(22) Filed: May 21, 2013

(65) Prior Publication Data

US 2013/0309037 A1    Nov. 21, 2013

Related U.S. Application Data

(60) Provisional application No. 61/649,649, filed on May 21, 2012.

(51) Int. Cl.
*B60P 7/08* (2006.01)
*B60P 7/06* (2006.01)

(52) U.S. Cl.
CPC ........................ *B60P 7/06* (2013.01)
USPC ........................................ 410/104

(58) Field of Classification Search
USPC ............................... 410/104, 105
See application file for complete search history.

(56) References Cited

U.S. PATENT DOCUMENTS

| | | | |
|---|---|---|---|
| 4,248,558 A | 2/1981 | Lechner | |
| 4,417,711 A | 11/1983 | Madej | |
| 4,575,295 A | 3/1986 | Rebentisch | |
| 4,635,992 A * | 1/1987 | Hamilton et al. | 296/37.6 |
| 4,961,553 A | 10/1990 | Todd | |
| 5,674,033 A | 10/1997 | Ruegg | |
| 6,082,804 A * | 7/2000 | Schlachter | 296/37.6 |
| 6,523,877 B1 * | 2/2003 | Damian | 296/37.6 |
| 6,679,461 B1 | 1/2004 | Hawkins | |
| 6,712,568 B2 | 3/2004 | Snyder et al. | |
| 6,799,927 B2 * | 10/2004 | Wheatley | 410/104 |
| 6,827,531 B2 | 12/2004 | Womack et al. | |
| 6,846,140 B2 * | 1/2005 | Anderson et al. | 410/104 |
| 7,070,374 B2 | 7/2006 | Womack et al. | |
| 7,281,889 B2 * | 10/2007 | Anderson et al. | 410/104 |
| 7,309,093 B2 * | 12/2007 | Ward | 296/37.6 |
| 7,350,853 B2 | 4/2008 | Fitze | |
| 7,390,154 B2 | 6/2008 | Womack et al. | |
| 7,497,651 B2 | 3/2009 | Harberts et al. | |
| 7,555,816 B2 * | 7/2009 | Walker | 16/355 |
| 7,594,787 B2 | 9/2009 | Womack et al. | |
| 7,819,295 B2 | 10/2010 | Plavetich | |
| 7,874,774 B2 | 1/2011 | Peterson | |
| 8,277,158 B2 | 10/2012 | Csik et al. | |
| 8,408,853 B2 | 4/2013 | Womack et al. | |
| 8,550,757 B2 | 10/2013 | Anderson et al. | |
| 2006/0061116 A1 * | 3/2006 | Haaberg | 296/37.6 |
| 2006/0102669 A1 * | 5/2006 | Fouts et al. | 224/404 |
| 2006/0244279 A1 * | 11/2006 | Ranka et al. | 296/37.6 |
| 2006/0263163 A1 | 11/2006 | Harberts et al. | |
| 2007/0036628 A1 | 2/2007 | Womack et al. | |
| 2007/0110539 A1 | 5/2007 | Klinkman et al. | |
| 2008/0185862 A1 * | 8/2008 | Tarrant et al. | 296/37.6 |
| 2013/0216326 A1 * | 8/2013 | Womack et al. | 410/105 |

* cited by examiner

*Primary Examiner* — H Gutman
(74) *Attorney, Agent, or Firm* — Butzel Long

(57) ABSTRACT

A rail mounting system includes a mounting rail that has a channel profile. The mounting rail is secured to a cargo area surface. Further, the rail mounting system includes a slide member that has a securement receiving area for securing a cargo product and the slide member within the channel profile of the mounting rail. The slide member is received within the channel profile.

14 Claims, 8 Drawing Sheets

RAIL MOUNTING SYSTEM

CROSS-REFERENCE TO RELATED APPLICATIONS

This application claims priority to U.S. provisional patent application 61/649,649, filed May 21, 2012, which is incorporated by reference in its entirety.

TECHNICAL FIELD

The present disclosure relates generally to a rail mounting system for creating an adjustable mounting surface for installing various cargo management products and systems.

BACKGROUND

Various types of rail mounting systems are known in the art. More specifically, rail mounting systems which are utilized within the context of commercial vehicles are known which allow for the transport of cargo items.

At least one type of conventional rail mounting system utilizes bolted attachments. Such a conventional rail mounting system does not provide flexibility for installing a variety of cargo management products (e.g., shelving, bins, drawer units, etc.). Further, through the foregoing conventional configuration, a point load is created that does not provide ways do distribute a load evenly over a mounting surface. An uneven distribution increases the possibility that the rail mounting system may become detached during an accident.

Accordingly, there is a need and desire for a rail mounting system that can provide flexibility for installing multiple cargo products and/or allow for distributing an applied load evenly over a mounting surface. This may enhance the securement of a rail mounting system and increase vehicular passenger safety during an accident.

SUMMARY

The present disclosure describes an improved rail mounting system that provides an adjustable mounting surface for installing cargo management products and systems, and the like into the cargo areas of vehicles, ships, airplanes, etc.

The present disclosure relates to a rail mounting system. The rail mounting system may include a mounting rail which includes a channel profile of a predetermined shape, and the mounting rail may be fixedly secured to a cargo area surface. Further, the rail mounting system may include a slide member which further includes a securement receiving area for securing a cargo product and the slide profile within the channel profile of the mounting rail. The slide member, which may be in part or in whole complementary to the channel profile, may be received within the channel and may be slidably movable within the channel.

A potential advantage of the present disclosure is that the rail mounting system allows for the distribution of an applied load evenly over a mounting surface. Another potential advantage is that one or more slide profiles may be used with a mounting rail to allow for the installation of various cargo products. A further potential advantage is that a user may select a position of a slide profile within the mounting rail to accommodate one or more cargo products in varying configurations.

Another potential advantage arises from the capability of a slide profile to create an enhanced locking state due, at least in part, to a cargo product resting on a top surface of the mounting rail and a flange included along a top surface of the slide profile which engages with a corresponding channel included within the channel profile of the mounting rail. A further potential advantage of the present disclosure may include the cost savings.

Other features and advantages of the present disclosure may be appreciated based upon the following description when considered in conjunction with the accompanying drawings.

DETAILED DESCRIPTION

Figure 1:
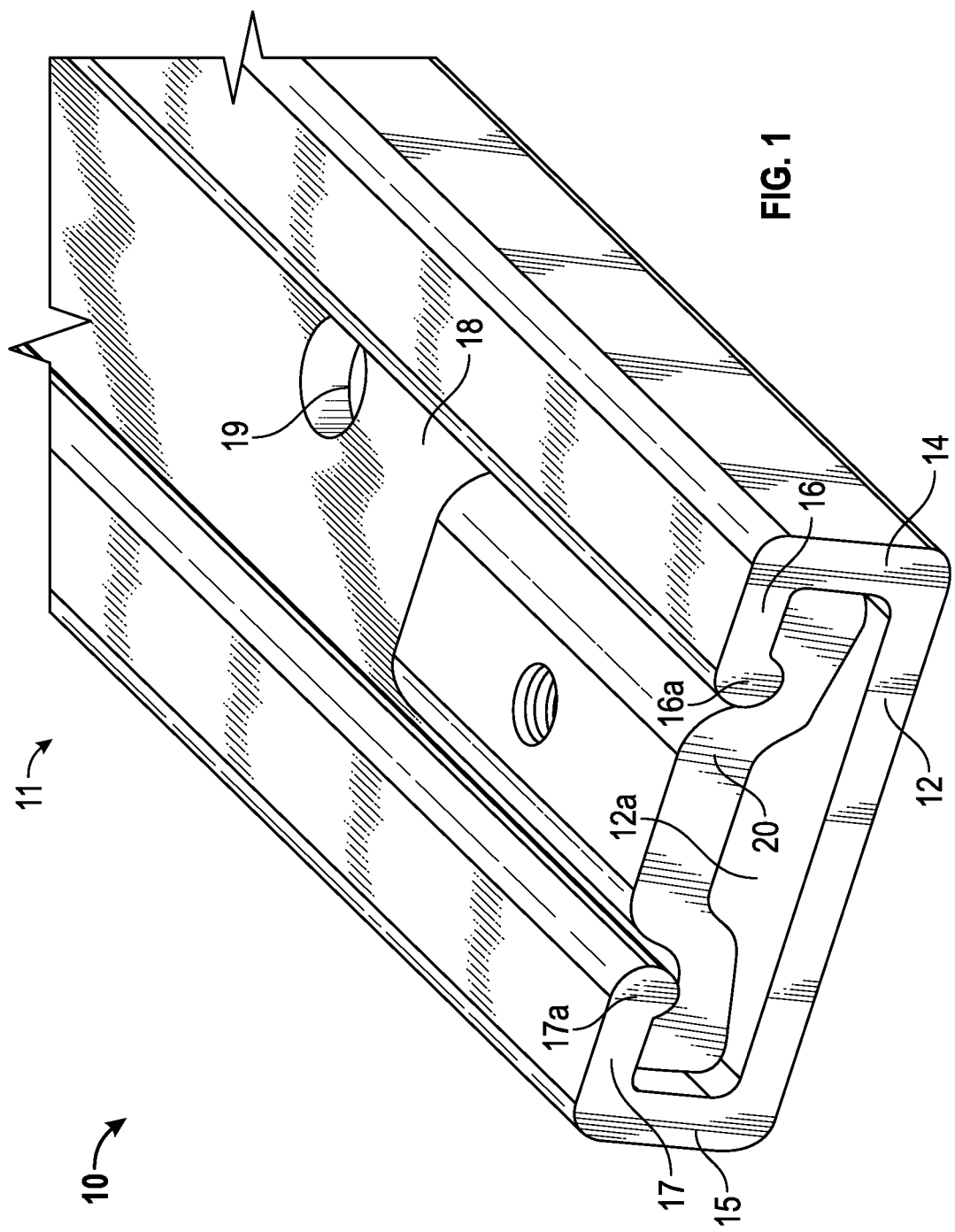
FIG. 1 is a perspective view of a mounting rail.

Referring to the following description and drawings, exemplary approaches to the disclosed systems are detailed. Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings Referring to FIGS. 1 and 2, an exemplary rail mounting system 10 is illustrated. The rail mounting system 10 includes a rail 11. The rail 11 includes a generally planar base 12 having an upper surface, a lower surface, and an outer edge. Other shapes and configurations of the rail 11 are contemplated. A sidewall, and in this example a pair of sidewalls 14, 15 extend upwardly and generally perpendicular to a longitudinal outer edge of the base 12. A guide wall 16, 17 extends generally perpendicular to a longitudinal outer edge of the side wall. The guide wall may be essentially parallel to the base. The outermost edge of the guide wall may have an integrally formed lip 16*a*, 17*a*. Accordingly, the arrangement of the base, sidewall and guide wall may collectively create the channel profile 18. Again, other configurations are contemplated.

In the example of FIG. 1, lips 16*a*, 17*a* extend downwardly toward the base 12. This feature is non-limiting as other features may be used that provide for the movement and/or securement of a slide member 20 within the channel 18 formed in the rail 11. Further, the sidewalls 14, 15 illustrated in the embodiment of FIG. 1 include essentially planar surfaces. However, it should be appreciated that the surfaces of the sidewalls 14, 15 may include another configuration or shape which would correspond with the structure of a slide member 20 and thereby provide a slidable coupling between a corresponding channel profile 18 of a mounting rail 10 and a slide member 20.

As shown in FIG. 1, the aforementioned features (e.g., base 12; sidewalls 14, 15; guides 16, 17; and lips 16*a*, 17*a*) of the rail 11 are integral and formed as one member; however, it should be appreciated that these features may likewise be made separable and coupled as required to arrive at the structural configuration of the mounting rail 10. Additionally, the mounting rail 10 may be formed using any suitably rigid material, such as aluminum, steel, plastics or any other material.

The outer surface of the base 12 may be secured to another member, such as a cargo area of a vehicle. The rail 11 may include a fastening hole 19 through which a fastener (not illustrated) is received to fixedly secure the mounting rail 10 to a cargo area surface. The fastener may include a screw, bolt, or any other suitable component which may provide a securement function.

The rail 11 may include one or more fastening holes 19 to fixedly secure the mounting railing 10. The fastening holes 19 may be positioned at predetermined locations within the base 12, such as to correspond with a given vehicle make/model in order to distribute the load, or to correspond with the predetermined length of the mounting rail 10 to distribute the load. In another example, the fastening holes 19 may be included at predetermined locations which correspond with existing mounting fastener locations.

The upper surface of the base 12 may include a raised portion to fill some or all of the volume identified by 12a. The raised portion may be of any suitable cross-sectional shape. In this example, the raised portion may centrally located on the base 12 and may run along the longitudinal axis of the base 12. The raised portion may include an inclined wall and a horizontal wall that cooperate to form a guide for the slide member.

Figure 2:
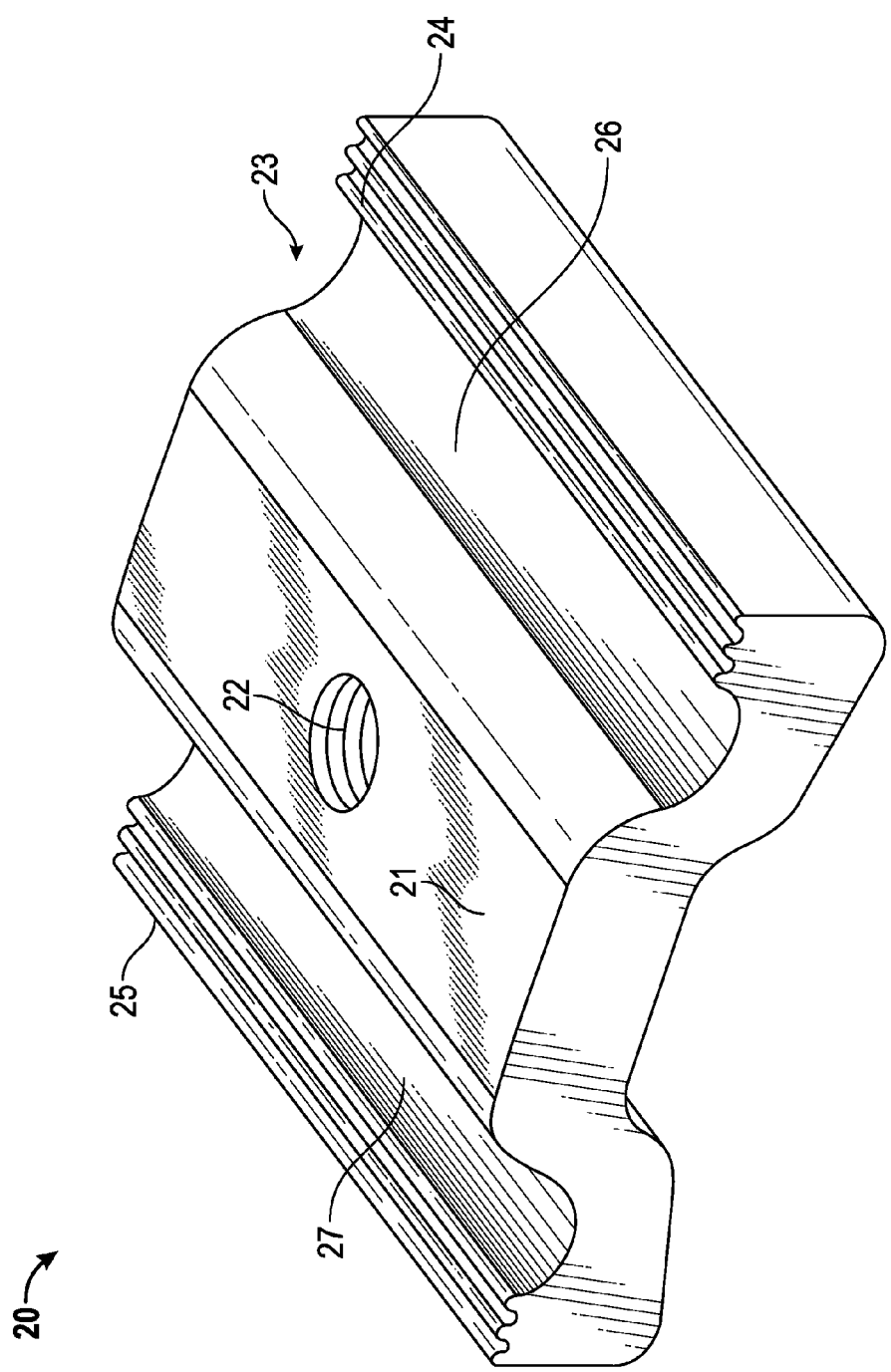
FIG. 2 is a perspective view of a slide profile.

Referring to FIG. 2, an exemplary slide member 20 is illustrated. The slide member 20 is slidably engaged within the rail channel profile 18. The slide member 20 has a predetermined shape, which in this example includes an upper wall 21, and an inclined side wall 23 extending from each longitudinal edge of the upper wall. The bottom surface of the slide profile 20 engages the upper wall of the base 12. An outermost edge of the inclined side wall 23 includes a lip 25. An upper wall of the lip 25 may includes a plurality of slots integrally formed therein as shown at 24 to form a flange. An engagement channel 26 is formed in the slide member sidewall 23, between the lip 25 and the upper wall 21. The flange 24 and the engagement groove 26 cooperatively engage a channel (not illustrated) included within a lower surface of the guide 16 and the lip 16a, respectively.

The upper wall of the slide member may include a securement receiving aperture 22. In the example of FIG. 2, the securement receiving aperture 22 is tapped or threaded. A securement feature 52 engages the securement receiving area 22, such as to provide: 1) a locking condition between a cargo item 42 and the slide member 20 (or alternatively a bracket may be included between the cargo item 42 and the slide member 20); and 2) a locking condition between the slide member 20 and the rail 10 via the channel profile 18.

Furthermore, through the engagement of the securement feature 52 within the securement receiving aperture 22 to secure the cargo item 42 thereto, a wedge action or friction is created which establishes an enhanced securement configuration between a portion of the cargo item 42 and an engaged portion of an upper surface of the guide walls 16, 17. Further, this wedge action or friction is additionally enhanced by the tension created from the securement feature 52 being tightened within the securement receiving aperture 22 to thereby create a locking force with the base 12 of the rail 11. Additionally, due to the slide member 20 having a shortened length in comparison to the overall length of the rail 11, the slide member 20 tends to move or tip during a crash condition in a direction which acts to create a further enhanced locking condition in the mounting rail 10. Also, an enhanced locking condition may further be realized due to the engagement of the flange 24 with a corresponding channel formed in the guide wall 16.

Accordingly, the aforementioned enhanced securement configuration maintains the slide profile 20 in a stationary position and in a locked condition. It should be appreciated that the securement feature 52 illustrated in FIG. 5 is non-limiting as other securement features which provide the aforementioned locking condition may be similarly used.

Figure 5:
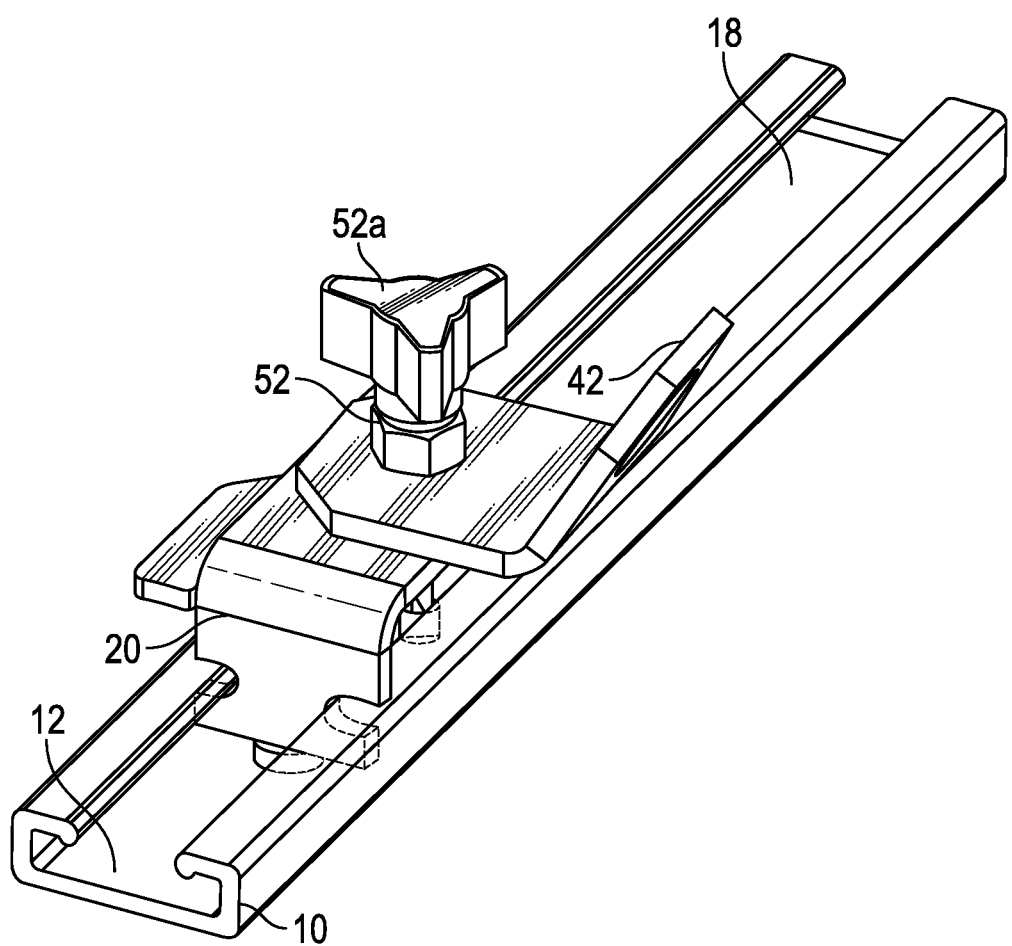
FIG. 5 is a perspective view of a mounting rail, a slide profile, a securement feature, and a portion of a cargo management product secured thereto.
Figure 6:
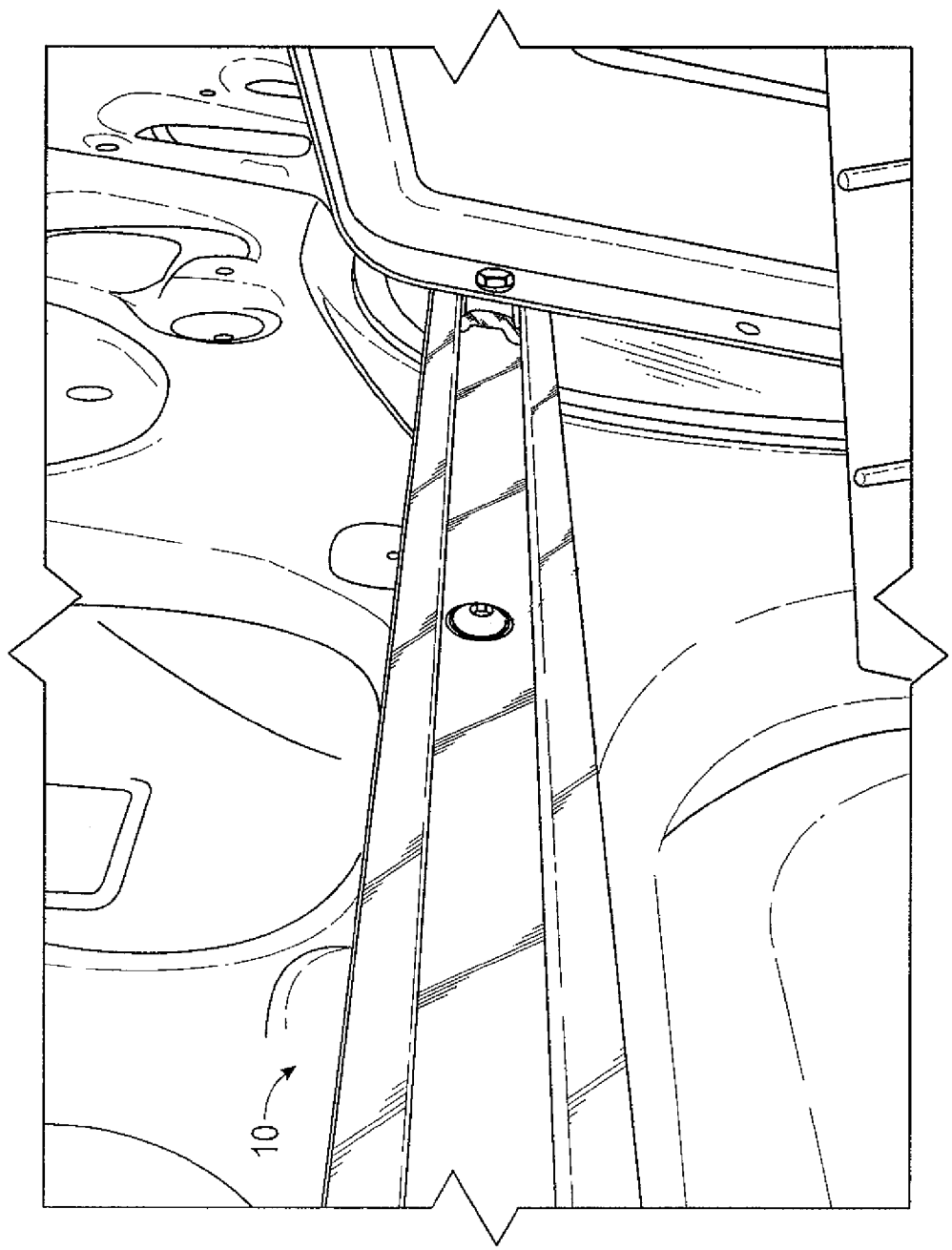
FIG. 6 is a perspective view of the mounting rail of FIG. 1 secured to a cargo area floor.
Figure 7:
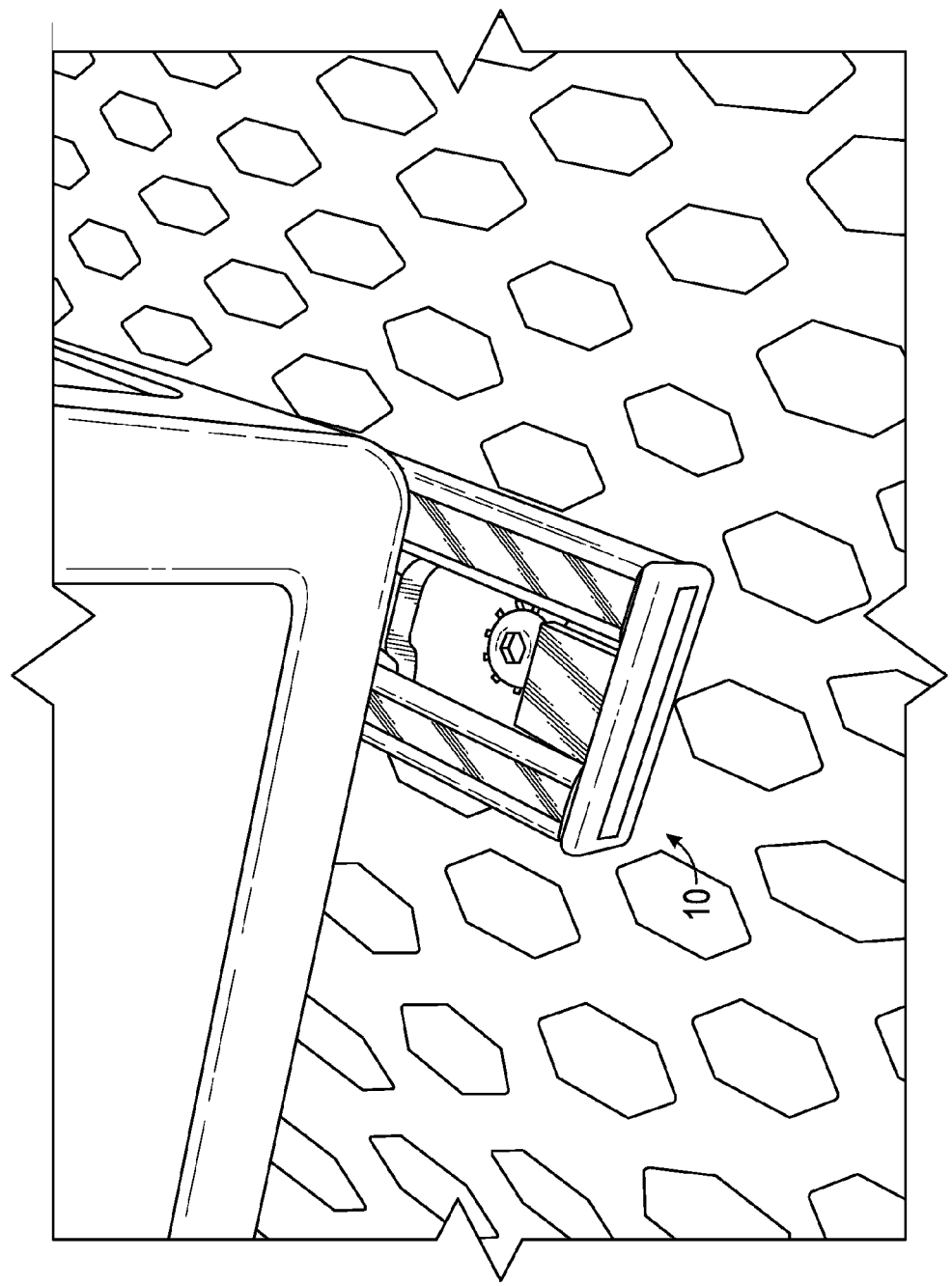
FIG. 7 is a perspective view of an end portion of the rail mounting system of FIG. 3.

In the embodiment of FIG. 5, a mounting rail 10 is illustrated which includes a base 12 having an essentially planar upper surface. It should be appreciated the like features have like reference numbers. Further, the slide member 20 of this example includes a configuration which provides slidable engagement with the channel profile 18 of the rail 10.

A securement member 52 fixedly secures a cargo item 42 (a portion of which is illustrated here) to the slide member 20. Further, in addition to providing the aforementioned securement function, the securement member 52 also provides a securing function between the slide member 20 and the rail 10. More specifically, the securement member 52 in this example is rotated until a locking force is established between the slide member 20 and the rail 10.

The securement member 52 may include a handle portion 52a and a fastening portion extending from the handle portion. The fastening portion is engaged within the threaded securement receiving aperture 22 formed in the slide profile 20. It should be appreciated that the shape of the handle portion 52a is non-limiting as another components could be instead utilized which includes a portion for establishing a connection with another mechanical device to thereby provide rotational movement of the fastener until a secure connection is established between the base 12 of the rail 10 and the slide member 20.

Figure 3:
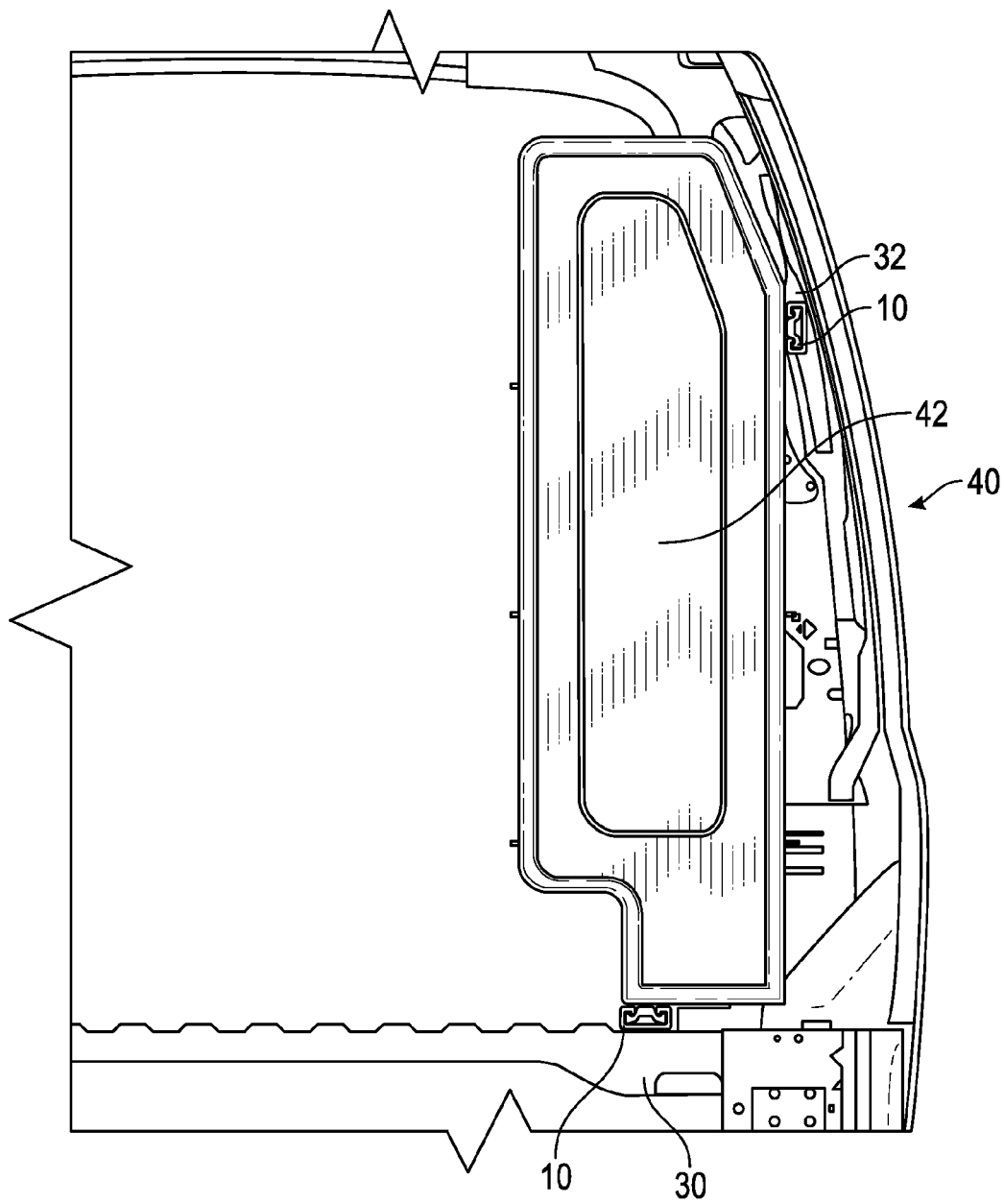
FIG. 3 is a side view of a rail mounting system installed in the cargo area of a vehicle.
Figure 4:
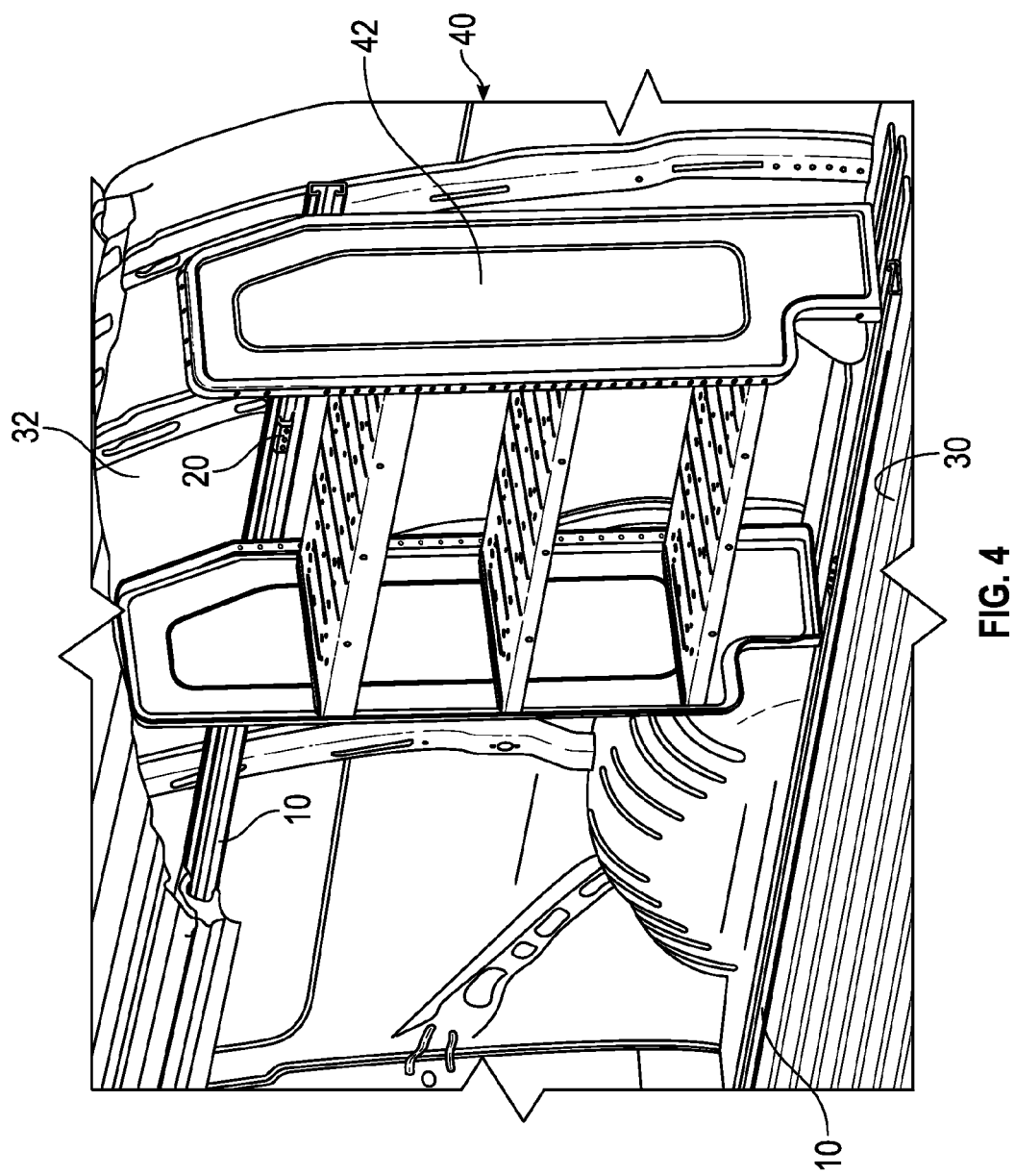
FIG. 4 is a perspective view of the rail mounting system of FIG. 3.

Referring to FIGS. 3 and 4, a rail mounting system 40 is illustrated for creating an adjustable mounting surface for installing various cargo management products and systems into a cargo area. The rail mounting system includes a slide member 20 which slidably engages with a channel profile 18 of a rail 10 to secure a cargo product 42. The rail mounting system 40 may include a plurality of rails 10. In this example, the rail 10 is fixedly secured to a cargo area floor 30 of the vehicle, and another rail 10 is fixedly secured to a cargo area sidewall 32 of the vehicle. Further, each of these rails 10 extend longitudinally along a respective cargo area surface. For example, the rails 10 may extend longitudinally along an entirety or a portion of the cargo area floor 30 or the cargo area sidewall 32. Further, the cargo product 42 is fixedly secured to the plurality of rails 10 via a plurality of slide members 20, respectively.

As shown in FIG. 4, the rail mounting system 40 may include one or more slide members 20 disposed within each of the rails 10 to accommodate a variety of different cargo items. Further, additional rails 10 beyond those illustrated in FIGS. 3 and 4 may be included within a rail mounting system 40 to accommodate different products of any type. Further, the rail mounting system 40 may be designed to include any necessary features beyond those previously described to accommodate one or more cargo products 42 or differing cargo products beyond those illustrated here.

Figure 8:
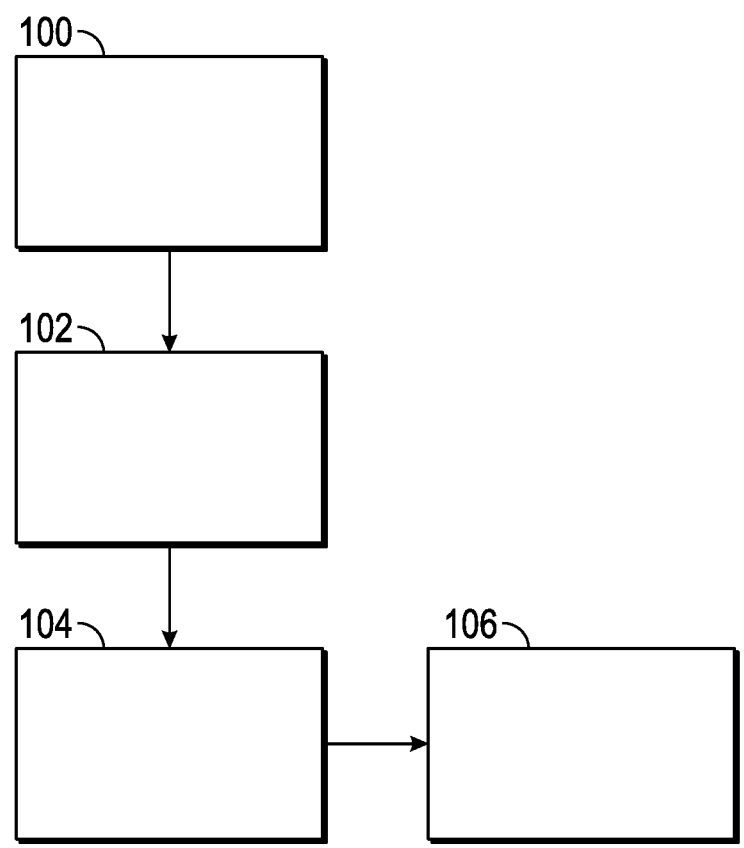
FIG. 8 is a block diagram of the installation of a rail mounting system within the cargo area of a vehicle.

Referring to FIG. 8, a method of installing a rail mounting system 40 within the cargo area of a vehicle is described. The methodology begins at step 100, and a mounting rail 10 is initially secured to a cargo area surface. In this step, a screw or the like is placed through a fastening hole 19 of a base 12 of a rail 10 for engagement with the cargo area surface and fastened until a locking condition is satisfied. The methodology advances to step 102, and a slide member 20 is received within a channel profile 18 formed in the rail 10. The methodology advances to step 104, and a cargo product 42 is positioned for engagement with the upper surface 21 of the slide member 20. The methodology advances to step 106, and the securement member 52 is positioned to secure the cargo item 42 onto the mounting rail 10. The securement member 52 is fastened until a locking condition is established between the base 12 of the rail 10 and the slide member 20.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

The invention claimed is:

1. A rail mounting system for a cargo area of a predetermined vehicle make, comprising:
   an elongate mounting rail extending in a longitudinal direction having a channel with a profile of a predetermined shape; and
   a slide member that has at least one portion that has a shape that is substantially complementary to at least a portion of the profile shape, the slide member being slidingly receiveable into the mounting rail channel;
   wherein the profile of the mounting rail is at least partially defined by a generally planar base, sidewalls extending upwardly and generally perpendicularly from opposite outer edges of the base, a guide wall extending generally perpendicularly from an upper edge of each of the sidewalls, and an integrally formed lip extending toward the base from an edge of each of the guide walls;
   wherein a plurality of fastening holes are defined in the generally planar base, the fastening holes positioned at predetermined locations corresponding with existing mounting fastener locations of the vehicle make; and
   wherein the slide member includes an upper wall that protrudes upwardly into a space between the lips of the mounting rail, inclined side walls that extend from each opposite edge of the upper wall, and a lip at an outermost edge of each of the inclined side walls, each of the lips of the slide member including a plurality of slots therein extending in the longitudinal direction and engaging a lower surface of a respective one of the guide walls to provide an enhanced locking condition.

2. The rail mounting system of claim 1, wherein the lips of the mounting rail are substantially cylindrical in shape.

3. The rail system of claim 1, wherein the slide member has an aperture therein, the slide member aperture being alignable with one of the at least one apertures in the rail.

4. A vehicle comprising at least one rail system of claim 1.

5. The vehicle of claim 4, further including a plurality of rail systems of claim 1, wherein at least one rail system is secured to a cargo area floor of the vehicle and another rail system is secured to a cargo area sidewall of the vehicle.

6. A method of installing a shelving unit in the cargo area of a vehicle, comprising:
   providing the rail mounting system of claim 1,
   mounting the mounting rail on a surface in the cargo area of a vehicle;
   inserting the slide member into the channel on the mounting rail adapted to receive the slide member;
   positioning the shelving unit for securement to the slide member; and
   securing the shelving unit with a securement member.

7. The method of claim 6 wherein mounting the rail includes securing the rail to the surface in the cargo area with a fastener extending through an aperture in the rail.

8. The method of claim 6 wherein the slide member has at least one aperture.

9. The method of claim 6 wherein the positioning the shelving unit includes aligning apertures in the shelving unit, the slide member and the rail.

10. The method of claim 6 wherein the securement member includes a handle portion and a fastening portion.

11. The method of claim 10 wherein securing includes rotating the handle portion until a locking force is established between the slide member and the rail.

12. A rail mounted shelving system, comprising:
   a rail mounting system of claim 1, including: a plurality of rails mountable to a plurality of surfaces in a cargo area of a vehicle, and a plurality of slide members, adapted to slidably move in the rail; and
   a shelving unit including at least one shelf extending between and secured to end panels at opposite ends of the shelf, the shelving unit mounted to the rails by a securement feature engaging each of the plurality of slide members to provide a locking condition between the shelving unit and the slide member, and a locking condition between the slide member and one of the rails.

13. A commercial vehicle having the rail mounting system of claim 12.

14. The rail system of claim 1, further comprising a securement feature engaging each of the plurality of slide members to provide a locking condition between a cargo item and the slide member, and a locking condition between the slide member and one of the rails.

* * * * *